(12) United States Patent
Okuda et al.

(10) Patent No.: US 8,697,773 B2
(45) Date of Patent: Apr. 15, 2014

(54) WHITE INK COMPOSITION

(75) Inventors: Ippei Okuda, Shiojiri (JP); Takayoshi Kagata, Shiojiri (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 13/014,057

(22) Filed: Jan. 26, 2011

(65) Prior Publication Data
US 2011/0184108 A1    Jul. 28, 2011

(30) Foreign Application Priority Data

Jan. 26, 2010  (JP) ................................ 2010-014483

(51) Int. Cl.
  *B41J 2/01*    (2006.01)
  *B41J 2/17*    (2006.01)
  *B41J 2/175*   (2006.01)
  *C08G 18/08*   (2006.01)
  *C08L 75/00*   (2006.01)
  *C09D 5/00*    (2006.01)
  *C09D 11/00*   (2006.01)
  *G01D 11/00*   (2006.01)

(52) U.S. Cl.
  USPC ............... 523/160; 347/1; 347/85; 347/95; 347/100; 523/161; 524/507

(58) Field of Classification Search
  USPC ........... 523/160, 161; 524/507; 347/1, 85, 95, 347/100
  See application file for complete search history.

(56) References Cited

U.S. PATENT DOCUMENTS

| 4,880,465 A | 11/1989 | Loria et al. |
| 6,715,869 B1 * | 4/2004 | Reem et al. ................ 347/100 |
| 7,279,511 B2 | 10/2007 | Zhu et al. |
| 2008/0138530 A1 * | 6/2008 | Lin et al. .................... 427/466 |
| 2009/0182098 A1 | 7/2009 | Sano et al. |

FOREIGN PATENT DOCUMENTS

| CN | 1748007 A | 3/2006 |
| JP | 3562754 A | 6/2004 |
| JP | 2006-96933 A | 4/2006 |
| JP | 2007-063316 A | 3/2007 |
| JP | 2009-509005 A | 3/2009 |
| JP | 2009-138077 A | 6/2009 |
| WO | 2004/053002 A1 | 6/2004 |
| WO | 2007/035505 A1 | 3/2007 |

OTHER PUBLICATIONS

Author unknown, "Microtrac S3000 Particle Size", http://www.vahitech.com/datasheet/Microtrac/S3000.pdf, date unknown, printed by examiner on Jun. 26, 2013.*

* cited by examiner

*Primary Examiner* — Patrick Niland
(74) *Attorney, Agent, or Firm* — Nutter McClennen & Fish LLP; John J. Penny, V; Christopher A. Potts

(57) ABSTRACT

A white ink composition contains a white coloring material and a fixing resin component. The fixing resin component includes a styrene acrylic resin and a urethane resin at a mass ratio of the styrene acrylic resin to the urethane resin (styrene acrylic resin/urethane resin) of at least 1/10.

7 Claims, No Drawings

WHITE INK COMPOSITION

BACKGROUND

1. Technical Field

The present invention relates to a white ink composition and a recorded matter obtained using the same.

2. Related Art

In image recording such as ink jet printing, usually, as a white coloring material, for example, a metal oxide, such as titanium dioxide, zinc oxide, silica, alumina, or magnesium oxide, or a white pigment, such as barium sulfate or calcium carbonate, is used. A white ink composition containing hollow resin particles as a white coloring material is also known (for example, see U.S. Pat. No. 4,880,465). In such a constitution, the internal cavities of the hollow resin particles are filled with a solvent in the ink composition. As a result, since the specific gravity of the hollow resin particles becomes substantially the same as that of the ink composition, the hollow resin particles can be stably dispersed in the ink composition. When an image formed on a recording medium using this ink composition, since the internal space of the hollow resin particles is replaced with air during drying, the hollow resin particles can exhibit a light-shielding effect due to light scattering caused by a difference in refractive index between the envelope and the cavity of the particle.

The ink composition contains a fixing resin for fixing the coloring material. JP-A-2009-138077 discloses a white ink composition containing hollow resin particles, serving as a white material, and a polyurethane resin having a glass transition temperature of 50° C. or less, serving as a fixing resin, and describes that such a constitution enables to form white images excellent in abrasion resistance. In addition, JP-A-2006-96933 discloses an ink jet recording ink containing a pigment and a fixing resin component, for fixing the pigment, composed of two types of polymers: an amphiphilic polymer and a polymer having a glass transition temperature (Tg) of −30 to 60° C. JP-A-2006-96933 describes that, in such a constitution, the ink jet recording ink can form letters and images excellent in water resistance, abrasion resistance, and bleeding resistance on various recording media and has satisfactory discharge stability. Thus, the performance of an ink composition and the quality of images formed thereby highly depend on the kind and blending conditions of the fixing resin component contained in the ink composition.

In some cases, the white ink composition is used to eliminate the background color for enhancing color development of a color image when the color image is formed on a medium having a background color that is not necessarily white, such as plastic products and metal products. Alternatively, in a case of forming a color image on a transparent sheet, the white ink composition may be used to form a white shielding layer for decreasing the light transmission of the color image. However, formation of an image by process color inks after formation of a base layer by the white ink composition has a problem that color inks applied onto the white image tend to bleed.

The present inventors have found that a urethane resin can impart excellent abrasion resistance to images, but make the surfaces of the images sticky, which may cause adhesion between the images when the recorded matter are stacked.

SUMMARY

An advantage of some aspects of the invention is to provide a white ink composition that can give a high-quality image while inhibiting stickiness of the image surface and, in particular, can be applied even to ink jet recording systems.

The present inventors have conducted intensive studies and, as a result, have found that a white ink composition containing a urethane resin and a styrene acrylic resin at a specific ratio as a fixing resin component can form a high-quality image having excellent whiteness and abrasion resistance and also being inhibited from bleeding with color ink, while the stickiness of the image surface is inhibited. Thus, the invention has been accomplished.

Aspects of the invention are as follows:

(1) A white ink composition containing a white coloring material and a fixing resin component including a styrene acrylic resin and a urethane resin at a mass ratio of the styrene acrylic resin to the urethane resin (styrene acrylic resin/urethane resin) of at least 1/10;

(2) The white ink composition according to aspect (1), wherein the white coloring material is a metal compound pigment;

(3) The white ink composition according to aspect (1) or (2), wherein the urethane resin is dispersed in a solvent in a particle form;

(4) The white ink composition according to any one of aspects (1) to (3), wherein the content of the urethane resin is 0.5 to 10% by mass based on the total mass of the white ink composition;

(5) The white ink composition according to aspect (3) or (4), wherein the urethane resin has an average particle diameter of 100 to 200 nm;

(6) The white ink composition according to any one of aspects (1) to (5), wherein the styrene acrylic resin is dispersed in a solvent in a particle form;

(7) The white ink composition according to aspect (6), wherein the styrene acrylic resin has an average particle diameter of 10 to 200 nm;

(8) The white ink composition according to any one of aspects (1) to (7), further containing at least one selected from alkanediols and glycol ethers;

(9) The white ink composition according to any one of aspects (1) to (8), further containing an acetylene glycol surfactant or a polysiloxane surfactant;

(10) The white ink composition according to any one of aspects (1) to (9), being applied to an ink jet recording system; and

(11) A recorded matter including an image formed by the white ink composition according to any one of aspects (1) to (10).

The white ink composition according to an aspect of the invention can form a high-quality image having excellent whiteness and abrasion resistance and also being inhibited from bleeding with color ink, while the stickiness of the image surface is inhibited.

DESCRIPTION OF EXEMPLARY EMBODIMENTS

White Ink Composition

A white ink composition according to an aspect of the invention will be described in detail below.

The white ink composition according to an aspect of the invention contains a white coloring material and a fixing resin component for fixing the coloring material. The fixing resin component includes a styrene acrylic resin and a urethane resin at a mass ratio of the styrene acrylic resin to the urethane resin (styrene acrylic resin/urethane resin) of at least 1/10.

1. White Coloring Material

The white ink composition according to an aspect of the invention contains, as a white coloring material, at least one selected from metal compounds and hollow resin particles. From the viewpoints of whiteness and abrasion resistance, metal compounds are preferred.

The metal compounds are those known as white pigments, such as metal oxides, barium sulfate, and calcium carbonate. The metal oxides are not particularly limited, and examples thereof include titanium dioxide, zinc oxide, silica, alumina, and magnesium oxide. As the metal compound used in an aspect of the invention, titanium dioxide and alumina are preferred.

The content of the metal compound is preferably 1 to 20% by mass, more preferably 5 to 15% by mass, based on the total mass of the white ink composition. A metal oxide content of greater than 20% by mass may cause, for example, clogging of an ink jet recording head, to deteriorate reliability of the ink composition. On the contrary, a content of lower than 1% by mass tends to cause insufficient color density such as whiteness.

The average particle diameter (outside diameter) of the metal compound is preferably 30 to 600 nm, more preferably 200 to 400 nm. An outside diameter of greater than 600 nm may deteriorate dispersion stability by, for example, precipitation of the particles or may deteriorate reliability, such as occurrence of clogging of an ink jet recording head. On the contrary, an outside diameter of smaller than 30 nm tends to cause insufficient whiteness.

The average particle diameter of the metal compound can be measured with a particle size analyzer employing a laser diffraction/scattering method as the measurement principle. An example of the laser diffraction particle size analyzer is a particle size analyzer employing a dynamic light scattering method as the measurement principle (e.g., "Microtrac UPA", a product of Nikkiso Co., Ltd.).

The hollow resin particles in an aspect of the invention have cavities inside and have envelopes preferably made of a resin having liquid permeability. In such a constitution, when the hollow resin particles are present in an aqueous ink composition, the internal cavities are filled with the aqueous medium. Since the particles filled with the aqueous medium have substantially the same specific gravity as that of the aqueous medium around the particles, the particles do not precipitate in the aqueous ink composition to maintain well dispersion stability. As a result, the storage stability and discharge stability of the ink composition can be enhanced.

In the white ink composition containing the hollow resin particles discharged on paper or another recording medium, the aqueous medium inside the particles is replaced with air during drying to form cavities. Since the particles contain the air inside, a resin layer and an air layer that differ from each other in refractive index are formed to effectively disperse incident light, resulting in formation of white color.

The hollow resin particles used in an aspect of the invention are not particularly limited and may be those publicly known. For example, hollow resin particles described in U.S. Pat. No. 4,880,465 or Japanese Patent No. 3,562,754 can be preferably used.

The average particle diameter (outside diameter) of the hollow resin particles is preferably 0.2 to 1.0 µm, more preferably 0.4 to 0.8 µm. An outside diameter of greater than 1.0 µm may deteriorate dispersion stability by, for example, precipitation of the particles or may deteriorate reliability, such as occurrence of clogging of an ink jet recording head. On the contrary, an outside diameter of smaller than 0.2 µm tends to cause insufficient color density such as whiteness. The inside diameter is preferably about 0.1 to 0.8 µm.

The average particle diameter of the hollow resin particles can be measured with a particle size analyzer employing a laser diffraction/scattering method as the measurement principle. An example of the laser diffraction particle size analyzer is a particle size analyzer employing a dynamic light scattering method as the measurement principle (e.g., "Microtrac UPA", a product of Nikkiso Co., Ltd.).

The content of the hollow resin particles (solid content) is preferably 5 to 20% by mass, more preferably 8 to 15% by mass, based on the total mass of the ink composition. If the content (solid content) of the hollow resin particles is greater than 20% by mass, for example, clogging of an ink jet recording head may occur to deteriorate reliability. On the contrary, a content of lower than 5% by mass tends to cause insufficient whiteness.

The hollow resin particles may be prepared by any method without limitation and may be prepared by a known method. For example, so-called emulsion polymerization can be applied to the preparation of the hollow resin particles: An emulsion of hollow resin particles is formed by stirring a vinyl monomer, a surfactant, a polymerization initiator, and an aqueous dispersion medium with heating under a nitrogen atmosphere.

Examples of the vinyl monomer include nonionic monoethylene unsaturated monomers such as styrene, vinyl toluene, ethylene, vinyl acetate, vinyl chloride, vinylidene chloride, acrylonitrile, (meth)acrylamide, and (meth)acrylic acid ester. Examples of the (meth)acrylic acid ester include methyl (meth)acrylate, ethyl(meth)acrylate, butyl(meth)acrylate, 2-hydroxyethyl(meth)acrylate, 2-ethylhexyl(meth)acrylate, benzyl(meth)acrylate, lauryl(meth)acrylate, oleyl(meth) acrylate, palmityl(meth)acrylate, and stearyl(meth)acrylate.

The vinyl monomer may be a difunctional vinyl monomer. Examples of the difunctional vinyl monomer include divinylbenzene, allyl (meth)acrylate, ethylene glycol di(meth)acrylate, 1,3-butane-diol di(meth)acrylate, diethylene glycol di(meth)acrylate, and trimethylol propane tri(meth)acrylate. High crosslinking of the monofunctional vinyl monomer and the difunctional vinyl monomer through copolymerization can give hollow resin particles having not only high light scattering but also excellent characteristics such as heat resistance, solvent resistance, and solvent dispersibility.

The surfactant may be any surfactant that can form molecular self-assembly, such as micelles, in water, and examples thereof include anionic surfactants, nonionic surfactants, cationic surfactants, and amphoteric surfactants.

The polymerization initiator may be a known water-soluble compound, and examples thereof include hydrogen peroxide and potassium persulfate.

Examples of the aqueous dispersion medium include water and water containing a hydrophilic organic solvent.

2. Fixing Resin Component

The white ink composition according to an aspect of the invention contains a fixing resin component for fixing the coloring material. In an aspect of the invention, the fixing resin component includes at least a urethane resin and a styrene acrylic resin.

The urethane resin in an aspect of the invention may be dispersed in a solvent in a particle form (emulsion type) or may be dissolved in a solvent (solution type), but the emulsion type is preferred. The emulsion type can be classified depending on the method for emulsification into a forced emulsification type and a self emulsification type. In an aspect of the invention, either type can be used.

Examples of the urethane resin used in an aspect of the invention include "Takelack (registered trademark) W-6061", "Takelack (registered trademark) W-605"), "Takelack (registered trademark) W-635", and "Takelack (registered trademark) W-6021" (products of Mitsui Chemicals, Inc.), and "WBR-016U" (a product of Taisei Fine Chemical Co., Ltd., polyether, Tg=20° C.)

Such a urethane resin can be produced by a known method, for example, by reacting a polyisocyanate, a polyol, and a chain extension agent in the presence or absence of a catalyst.

In the case that an emulsion-type urethane resin is used, the average particle diameter of the urethane resin particles is preferably 30 to 200 nm, more preferably 50 to 200 nm, more preferably 60 to 200 nm, and most preferably 100 to 200 nm. In this range of average particle diameter, the urethane resin particles can be uniformly dispersed in the white ink composition. From the viewpoint of abrasion resistance, an average particle diameter of 100 nm or more is preferred.

The content (solid content) of the urethane resin is preferably 0.5 to 10% by mass, more preferably 0.5 to 5% by mass, based on the total mass of the ink composition. A urethane resin content of greater than 10% by mass may deteriorate reliability of the ink (e.g., clogging and discharge stability), which may not provide physical properties (e.g., viscosity) suitable as ink. On the contrary, when the content is less than 0.5% by mass, the property for fixing ink on a recording medium is not excellent, and an image excellent in abrasion resistance cannot be formed, which is undesirable also from the viewpoint of whiteness.

Examples of the styrene acrylic resin used in an aspect of the invention include "Joncryl 450", "Joncryl 511", "Joncryl 711", "Joncryl 7001", and "Joncryl 632" (products of BASF Corp.). These have a molecular weight of about 1000 to 100000.

In the case that an emulsion-type styrene acrylic resin is used, the average particle diameter of the styrene acrylic resin particles is preferably 10 to 200 nm, more preferably 20 to 200 nm. In this range of the average particle diameter, the styrene acrylic resin particles can be uniformly dispersed in the white ink composition.

The content (solid content) of the styrene acrylic resin is preferably 0.5 to 10% by mass, more preferably 0.5 to 5% by mass, based on the total mass of the ink composition. A styrene acrylic resin content of greater than 10% by mass may deteriorate the fixing property of a printed matter. On the contrary, if the content is less than 0.5% by mass, the content of the urethane resin contained in the ink is also small. Therefore, excellent abrasion resistance of the ink on a recording medium cannot be obtained, and, therefore, an image excellent in abrasion resistance cannot be formed.

In the white ink composition according to an aspect of the invention, the mass ratio of the styrene acrylic resin to the urethane resin (styrene acrylic resin/urethane resin) is 1/10 or more, preferably 2/10 or more. The white ink composition according to an aspect of the invention can form a high-quality image having excellent whiteness and abrasion resistance and also being inhibited from bleeding with color ink, while the stickiness of the image surface is inhibited, by containing the styrene acrylic resin and the urethane resin at the above-mentioned mass ratio. If the amount of the styrene acrylic resin is small such that the mass ratio of the styrene acrylic resin to the urethane resin (styrene acrylic resin/urethane resin) is smaller than 1/10, desired effects cannot be achieved: The surface of a recorded matter is sticky, which may cause adhesion between recorded matters when they are stacked. On the contrary, if the amount of the styrene acrylic resin is too high, the abrasion resistance is low. Therefore, the mass ratio of the styrene acrylic resin to the urethane resin (styrene acrylic resin/urethane resin) is preferably 5/10 or less.

3. Other Components

The white ink composition according to an aspect of the invention preferably contains at least one selected from alkanediols and glycol ethers. The alkanediols and the glycol ethers increase wettability of the ink composition to a surface of, for example, a recording medium to increase the permeability of the ink.

The alkanediols are preferably 1,2-alkanediols having 4 to 8 carbon atoms, such as 1,2-butanediol, 1,2-pentanediol, 1,2-hexanediol, 1,2-heptanediol, and 1,2-octanediol. Among them, 1,2-alkanediols having 6 to 8 carbon atoms, such as 1,2-hexanediol, 1,2-heptanediol, and 1,2-octanediol, have particularly high permeability to a recording medium and are therefore more preferred.

Examples of the glycol ether include polyol lower-alkyl ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. In particular, triethylene glycol monobutyl ether can provide satisfactory recording quality.

The content of the at least one selected from these alkanediols and the glycol ethers is preferably 1 to 20% by mass, more preferably 1 to 10% by mass, based on the total mass of the white ink composition.

The white ink composition according to an aspect of the invention preferably contains an acetylene glycol surfactant or a polysiloxane surfactant. The acetylene glycol surfactant and the polysiloxane surfactant increase wettability of the ink composition to a surface of, for example, a recording medium to increase the permeability of the ink.

Examples of the acetylene glycol surfactant include 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol. The acetylene glycol surfactant may be a commercially available one, such as Olfin E1010, STG, and Y (products of Nisshin Chemical Industry Co., Ltd.) and Surfinol 104, 82, 465, 485, and TG (products of Air Products and Chemicals Inc.).

The polysiloxane surfactant may be a commercially available one, such as BYK-347 and BYK-348 (products of BYK-Chemie Japan K.K.).

The white ink composition according to an aspect of the invention may contain another surfactant such as an anionic surfactant, a nonionic surfactant, or an amphoteric surfactant.

The content of the above-mentioned additional surfactant is preferably 0.01 to 5% by mass, more preferably 0.1 to 0.5% by mass, based on the total mass of the white ink composition.

The white ink composition according to an aspect of the invention preferably contains a polyol. When the white ink composition of the invention is applied to an ink jet recording apparatus, the polyol inhibits drying of the ink to prevent clogging of the head of the ink jet recording apparatus.

Examples of the polyol include ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylol ethane, and trimethylol propane.

The content of the polyol is preferably 0.1 to 30% by mass, more preferably 0.5 to 20% by mass, based on the total mass of the white ink composition.

The white ink composition according to an aspect of the invention preferably contains a tertiary amine. The tertiary amine has a function as a pH adjuster and can readily regulate the pH of the white ink composition.

An example of the tertiary amine is triethanol amine.

The content of the tertiary amine is preferably 0.01 to 10% by mass, more preferably 0.1 to 2% by mass, based on the total mass of the white ink composition.

The white ink composition according to an aspect of the invention usually contains water as a solvent. The water is preferably pure water or ultrapure water, such as ion-exchanged water, ultrafiltered water, reverse osmosis water, or distilled water. In particular, pure or ultrapure water subjected to sterilization with ultraviolet irradiation or addition of hydrogen peroxide can prevent occurrence of mold and bacteria over a long period of time and is therefore preferred.

The white ink composition according to an aspect of the invention may further contain additives, according to need, for example, a fixing agent such as a water-soluble rosin, an anti-fungal/anti-septic agent such as sodium benzoate, an antioxidant/ultraviolet absorber such as an allophanate, a chelating agent, or an oxygen absorber. These additives may be used alone or in combination.

The white ink composition according to an aspect of the invention can be prepared with a known apparatus, such as a ball mill, a sand mill, an attritor, a basket mill, or a roll mill, as in preparation of known pigment ink. In the preparation, coarse particles are preferably removed with a membrane filter or a mesh filter.

The white ink composition according to an aspect of the invention can form a white image by being applied onto various recording media. Examples of the recording media include paper, cardboard, fiber products, sheets or films, plastics, glass, and ceramics.

The uses of the white ink composition according to an aspect of the invention are not particularly limited, and the white ink composition can be applied to various ink jet recording systems. Examples of the ink jet recording systems include thermal ink jet systems, piezoelectric ink jet systems, continuous ink jet systems, roller application systems, and spray application systems.

Recorded Matter

The invention can provide a recorded matter having an image formed by the white ink composition described above. The recorded matter according to an aspect of the invention is a high-quality white recorded matter having excellent whiteness and abrasion resistance and also being inhibited from bleeding with color ink, while the stickiness of the image surface is inhibited.

EXAMPLES

The invention will be described in detail with reference to examples below, but is not limited to the examples.

1. Preparation of White Ink Composition

Ink compositions of Examples 1 to 7, Comparative Examples 1 to 3, and Reference Example were each prepared by mixing and stirring a coloring material, a fixing resin or fixing resins, an organic solvent, a polyol, a tertiary amine, a surfactant, and ion-exchanged water at a blending ratio shown in Table and subjecting the mixture filtration through a 5 μm metal filter and then deaeration treatment with a vacuum pump. The unit of numerical values of Examples 1 to 7, Comparative Examples 1 to 3, and Reference Example shown in Table is "% by mass". Titanium dioxide particles, hollow resin particles, urethane resin particles, styrene acrylic resin particles, and polyethylene wax are expressed in terms of solid contents.

The titanium dioxide particles shown in Table were a marketed product, "NanoTek (R) Slurry" (a product of CI Chemical Co., Ltd.). NanoTek (R) Slurry contains titanium dioxide particles having an average particle diameter shown in Table at a ratio of 15%.

The hollow resin particles shown in Table were a marketed product, "SX8782(D)" (a product of JSR Corp.). SX8782(D) is an aqueous dispersion type having an outside diameter of 1.0 μm and an inside diameter of 0.8 μm, and the solid content thereof is 20.5%.

The surfactant was a polysiloxane surfactant, "BYK-348" (a product of BYK-Chemie Japan K.K.).

The fixing resins shown in Table were as follows:
Urethane resin A: "W-605" (a product of Mitsui Chemicals Polyurethanes Inc.), average particle diameter: 135 nm
Urethane resin B: "W-635" (a product of Mitsui Chemicals Polyurethanes Inc.), average particle diameter: 37 nm
Styrene acrylic resin A: "Joncryl 450" (a product of BASF Corp.), average particle diameter: 37 nm
Styrene acrylic resin B: "Joncryl 632" (a product of BASF Corp.), average particle diameter: 100 nm
Polyethylene wax: "AQ515"(a product of BYK-Chemie Japan K.K.), average particle diameter: 45 nm 2. Evaluation of Printed Matter The white ink compositions shown in Table were each loaded on a black ink chamber of a cartridge for exclusive use on an ink jet printer ("PX-G930", a product of Seiko Epson Corp.). The thus-prepared ink cartridge was mounted on the printer, and a printing test was performed. Ink cartridges other than the black were each loaded with commercially available one. This is used as a dummy and is not used for evaluation in this Example and is therefore uninvolved in the effect.

Then, the output was conducted at a resolution of 1440× 720 dpi on Lumirror S10-100 μm (a product of Toray Industries, Inc., a commercially available PET sheet not having ink receiving layer). The printing pattern was a 100% duty solid pattern.

The "duty" is a value calculated by the following expression:

$$\text{Duty (\%)} = \{(\text{actual number of dots printed})/(\text{vertical resolution}) \times (\text{horizontal resolution})\} \times 100$$

(in the expression, the "actual number of dots printed" refers to the actual number of dots printed per unit area; and the "vertical resolution" and the "horizontal resolution" each refer to the resolution per unit area. 100% duty refers to the maximum mass of ink of a single color for the pixels).

Whiteness

Whiteness of a printed matter was evaluated by measuring L* value in a CIE/L*a*b* color coordinate system using a commercially available colorimeter based on black, for example, Gretag Macbeth Spectroscan and Spectrolino (products of X-Rite). The evaluation criteria were as follows:
A (point 20): L value of not less than 75,
B (point 15): L value of not less than 73 and less than 75,
C (point 10): L value of not less than 70 and less than 73, and
D (point 5): L value of less than 70.

Surface Condition

The surface condition of a printed matter was visually investigated. The evaluation criteria were as follows:
A (point 10): no stickiness and unevenness on the surface of a printed matter, B (point 5): slight stickiness or slight unevenness on the surface of a printed matter, and C (point −10): stickiness or unevenness on the surface of a printed matter.

Abrasion Resistance

The abrasion resistance was evaluated by an "abrasion test with a nail or a cloth" by a person in charge of the test for a PET sheet on which the white ink composition was printed and dried in a thermostatic bath at 50° C. for 10 minutes. In the abrasion test with a nail or a cloth, the printed surface was rubbed with a nail or a cloth to and for two or three times. The evaluation criteria were as follows:

A (point 10): no peeling-off of the printed surface even when rubbed with a nail, B (point 5): partial peeling-off of the printed surface when rubbed with a nail, C (point 0): peeling-off of the printed surface when rubbed with a nail, but not with a cloth, and D (point −10): peeling-off of the printed surface even when rubbed with a cloth.

Evaluation Method

Bleeding at the interface of the two colors of each printed pattern was investigated at each duty and was evaluated by the following criteria:

A (point 10): no occurrence of bleeding even at 100% duty,

B (point 5): no occurrence of bleeding until 70% duty,

C (point 0): no occurrence of bleeding until 40% duty, and

D (point −10): occurrence of bleeding even at 40% duty.

Total Quality

Total quality was evaluated from the evaluation results described above. The evaluation criteria were as follows:

A: 45 or more points,

B: 35 or more and less than 45 points,

C: 25 or more and less than 35 points, and

D: less than 25 points.

Table shows the results.

TABLE

| | | Example 1 | Example 2 | Example 3 | Example 4 | Example 5 | Example 6 | Example 7 | Comp. Ex. 1 | Comp. Ex. 2 | Comp. Ex. 3 | Ref. Ex. 1 |
|---|---|---|---|---|---|---|---|---|---|---|---|---|
| Coloring material | TiO$_2$ particle (φ: 250 nm) | 10 | 10 | 10 | — | — | 10 | 10 | 10 | 10 | 10 | 10 |
| | TiO$_2$ particle (φ: 100 nm) | — | — | — | — | 10 | — | — | — | — | — | — |
| | hollow resin particle (outside φ: 1.0 μm, inside φ: 0.8 μm,) | — | — | — | 10 | — | — | — | — | — | — | — |
| Fixing resin | urethane resin A (φ: 135 nm) | 4 | 5 | 5 | 5 | 5 | — | 5 | 4 | — | 5 | 0.5 |
| | urethane resin B (φ: 37 nm) | — | — | — | — | — | 5 | — | — | — | — | — |
| | styrene acrylic resin (φ: 37 nm) | 2 | 1 | 0.5 | 1 | 1 | 1 | — | — | 4 | — | 5 |
| | styrene acrylic resin (φ: 100 nm) | — | — | — | — | — | — | 1 | — | — | — | — |
| | polyethylene wax (φ: 45 nm) | — | — | — | — | — | — | — | — | — | 1 | — |
| Surfactant | | 1 | 1 | 1 | 1 | 1 | 1 | 1 | 1 | 1 | 1 | 1 |
| Propylene glycol | | 2 | 2 | 2 | 2 | 2 | 2 | 2 | 2 | 2 | 2 | 2 |
| 1,2-Hexanediol | | 5 | 5 | 5 | 5 | 5 | 5 | 5 | 5 | 5 | 5 | 5 |
| 2-Pyrrolidone | | 2 | 2 | 2 | 2 | 2 | 2 | 2 | 2 | 2 | 2 | 2 |
| Ion-exchanged water | | balance | balance | balance | balance | balance | balance | balance | balance | balance | balance | balance |
| Styrene acryl:urethane ratio | | 5:10 | 2:10 | 1:10 | 2:10 | 2:10 | 2:10 | 2:10 | 0:10 | 10:0 | — | 10:1 |
| Whiteness | | 20 | 20 | 20 | 15 | 15 | 20 | 20 | 20 | 15 | 15 | 15 |
| Surface condition | | 5 | 5 | −10 | 10 | 5 | 5 | 5 | −10 | 10 | −10 | 5 |
| Abrasion resistance | | 0 | 10 | 5 | 0 | 10 | 5 | 10 | 5 | −10 | 5 | −10 |
| Bleeding | | 10 | 10 | 10 | 10 | 10 | 10 | 10 | 5 | 5 | 10 | 10 |
| Total | | 35 | 45 | 25 | 35 | 40 | 40 | 45 | 20 | 20 | 20 | 20 |
| Total quality | | B | A | C | B | B | B | A | D | D | D | D |

Bleeding

Recording Method

A 100% duty white solid pattern was printed on Lumirror S10-100 μm (a product of Toray Industries, Inc.) as a recording medium having a plastic film on the recording surface using an ink jet printer (PX-G930, a product of Seiko Epson Corp.) loaded with five color ink compositions: C, M, Y, K, and white, at a resolution of 1440×720 dpi with each of the prepared ink compositions by heating the sheet feeder with a dryer at 70° C. so that the temperature of a recording medium during printing is 45° C. Immediate after the printing, patterns having duties ranging from 15% to 100% in which two colors are in contact with each other were printed on the white solid pattern at a resolution of 1440×720 dpi.

It is obvious from Table that excellent whiteness and abrasion resistance and inhibition of bleeding with color ink can be achieved with high reliability, while inhibiting stickiness of the image surface, by adding a urethane resin and a styrene acrylic resin serving as a fixing resin component in a certain weight ratio range to the white ink composition.

What is claimed is:

1. A white ink composition, comprising:
   a white coloring material and a fixing resin component, wherein
   the fixing resin component comprises a styrene acrylic resin and a urethane resin at a mass ratio of the styrene acrylic resin to the urethane resin (styrene acrylic resin/ urethane resin) of at least 1/10, and the content of the styrene acrylic resin is 0.5 to 10% by mass based on the total mass of the white ink composition, and the content of the urethane resin is 0.5 to 10% by mass based on the total mass of the white ink composition.

2. The white ink composition according to claim 1, wherein the white coloring material is a metal compound pigment.

3. The white ink composition according to claim 1, wherein the urethane resin is dispersed in a solvent in a particle form.

4. The white ink composition according to claim 1, wherein the styrene acrylic resin is dispersed in a solvent in a particle form.

5. The white ink composition according to claim 1, further comprising at least one selected from alkanediols and glycol ethers.

6. The white ink composition according to claim 1, wherein the white ink composition is used in an ink jet recording printer that records the white ink composition to a medium using an ink jet recording head.

7. The white ink composition according to claim 1, the mass ratio is at least 2/10.

* * * * *